(12) United States Patent
Gueret

(10) Patent No.: US 7,594,595 B2
(45) Date of Patent: Sep. 29, 2009

(54) DEVICE AND METHOD FOR DISPENSING A PRODUCT

(75) Inventor: Jean-Louis H. Gueret, Paris (FR)

(73) Assignee: L'Oréal S.A., Paris (FR)

( * ) Notice: Subject to any disclaimer, the term of this patent is extended or adjusted under 35 U.S.C. 154(b) by 1371 days.

(21) Appl. No.: 10/260,297

(22) Filed: Oct. 1, 2002

(65) Prior Publication Data
US 2003/0132240 A1    Jul. 17, 2003

(30) Foreign Application Priority Data
Oct. 1, 2001   (FR) ................... 01 12599

(51) Int. Cl.
*B65D 37/00* (2006.01)
(52) U.S. Cl. .............. 222/212; 222/1; 222/189.09; 222/491; 222/494
(58) Field of Classification Search ............ 222/212, 222/215, 213, 207, 494, 564, 1, 491, 490, 222/209, 189.09
See application file for complete search history.

(56) References Cited
U.S. PATENT DOCUMENTS

| | | | |
|---|---|---|---|
| 1,315,305 A | 9/1919 | Hegland | |
| 1,918,215 A | 7/1933 | Runnels | |
| 2,135,237 A * | 11/1938 | Lewis et. al. | 222/490 |
| 2,232,140 A | 2/1941 | Rupp | |
| 2,659,919 A | 11/1953 | McCabe et al. | |
| 2,837,756 A | 6/1958 | Barlow | |
| 2,841,809 A | 7/1958 | Oliver | |
| 2,853,727 A | 9/1958 | Nadai | |
| 2,975,464 A | 3/1961 | Schultz | |
| 3,010,138 A * | 11/1961 | Nadai | 401/13 |
| 3,084,375 A | 4/1963 | Schwartzman | |
| 3,113,336 A | 12/1963 | Langnickel | |
| 3,129,452 A | 4/1964 | Schwartzman | |

(Continued)

FOREIGN PATENT DOCUMENTS

CN   2280055 Y   4/1998

(Continued)

OTHER PUBLICATIONS

English language Derwent Abstract of FR 2 294 533, Jul. 9, 1976.

(Continued)

*Primary Examiner*—Frederick C. Nicolas
(74) *Attorney, Agent, or Firm*—Finnegan, Henderson, Farabow, Garrett & Dunner, L.L.P.

(57) ABSTRACT

A device for dispensing a product may include a receptacle including at least one elastically deformable wall configured to be deformed to vary an interior volume of the receptacle, and a flow reducer defining a length and at least one passage. The flow reducer may at least partially include an elastically deformable, compressible material. The at least one passage may be substantially closed at at least one portion of its length when the flow reducer is in a substantially closed, at rest position. The at least one passage may be configured to enlarge when the compressible material is at least partially compressed via the effect of pressure from the product when the interior volume of the receptacle is reduced, thereby enabling dispensing of at least a portion of the product via the at least one passage.

120 Claims, 8 Drawing Sheets

U.S. PATENT DOCUMENTS

| | | | |
|---|---|---|---|
| 3,132,370 A | | 5/1964 | Capezzuto |
| 3,133,309 A | | 5/1964 | Miles |
| 3,226,762 A | | 1/1966 | Norman |
| 3,248,017 A | * | 4/1966 | Allen .......................... 222/207 |
| 3,266,079 A | | 8/1966 | Schartzman |
| 3,285,296 A | * | 11/1966 | Ishimaru et al. .......... 73/864.02 |
| 3,369,666 A | * | 2/1968 | Hultgren et al. ............. 210/130 |
| 3,444,808 A | | 5/1969 | Schwartzman |
| 3,463,597 A | | 8/1969 | Wakai |
| 3,601,287 A | | 8/1971 | Schwartzman |
| 3,661,468 A | | 5/1972 | Schwartzman |
| 3,684,137 A | * | 8/1972 | Coleman .................... 222/490 |
| 3,913,789 A | * | 10/1975 | Miller ........................ 222/107 |
| 4,084,033 A | | 4/1978 | Drelich |
| 4,133,457 A | * | 1/1979 | Klassen ..................... 222/212 |
| 4,225,253 A | | 9/1980 | Fraleigh |
| 5,013,459 A | * | 5/1991 | Gettings et al. ............. 210/764 |
| 5,022,517 A | | 6/1991 | Benitez |
| 5,082,386 A | | 1/1992 | Hironaka et al. |
| 5,163,767 A | | 11/1992 | Lucas |
| 5,178,300 A | * | 1/1993 | Haviv et al. ................... 222/95 |
| 5,186,368 A | | 2/1993 | Garcia |
| 5,294,112 A | * | 3/1994 | Smith ......................... 473/610 |
| 5,368,581 A | | 11/1994 | Smith et al. |
| 5,409,144 A | * | 4/1995 | Brown ..................... 222/185.1 |
| 5,439,143 A | * | 8/1995 | Brown et al. ............. 222/185.1 |
| 5,490,938 A | * | 2/1996 | Sawan et al. ................ 210/651 |
| 5,562,650 A | | 10/1996 | Everett et al. |
| 5,573,033 A | * | 11/1996 | Litzel ...................... 137/512.3 |
| 5,899,368 A | * | 5/1999 | Joulia ......................... 222/507 |
| 5,924,605 A | | 7/1999 | Baudin et al. |
| 6,055,979 A | * | 5/2000 | Fuchs .................... 128/203.15 |
| 6,152,324 A | | 11/2000 | Baudin |
| 6,199,725 B1 | * | 3/2001 | Garibaldi .................... 222/207 |
| 6,220,254 B1 | * | 4/2001 | Gueret ........................ 132/313 |
| 6,293,437 B1 | * | 9/2001 | Socier et al. ................. 222/212 |
| 6,386,781 B1 | | 5/2002 | Gueret |

FOREIGN PATENT DOCUMENTS

| | | |
|---|---|---|
| DE | 36 25 418 A1 | 2/1988 |
| EP | 0 390 922 B1 | 10/1990 |
| EP | 0 872 193 B1 | 10/1998 |
| EP | 1 094 011 A1 | 4/2001 |
| FR | 2 294 533 | 7/1976 |
| FR | 2 771 078 | 5/1999 |
| GB | 470 101 | 8/1937 |
| GB | 869 580 | 5/1961 |
| JP | 52-171555 | 12/1977 |
| JP | 53-20257 | 2/1978 |
| JP | 2001161436 | 6/2001 |
| WO | WO 97/31553 | 9/1997 |
| WO | WO 98/39991 A1 | 9/1998 |

OTHER PUBLICATIONS

U.S. Appl. No. 09/691,944, filed Oct. 20, 2000.
Election of Species Requirement issued Feb. 5, 2002, in U.S. Appl. No. 09/691,944.
Response to Election of Species Requirement, filed Mar. 5, 2002, in U.S. Appl. No. 09/691,944.
Office Action issued Jun. 14, 2002, in U.S. Appl. No. 09/691,944.
Amendment filed Sep. 13, 2002, in U.S. Appl. No. 09/691,944.
Final Office Action issued Dec. 10, 2002, in U.S. Appl. No. 09/691,944.
Amendment After Final filed Mar. 10, 2003, in U.S. Appl. No. 09/691,944.
Advisory Action issued Mar. 26, 2003, in U.S. Appl. No. 09/691,944.
Request for Continued Examination (RCE) Transmittal filed Apr. 8, 2003, in U.S. Appl. No. 09/691,944.
Office Action issued Jun. 30, 2003, in U.S. Appl. No. 09/691,944.
Amendment filed Sep. 29, 2003, in U.S. Appl. No. 09/691,944.
Office Action issued Dec. 16, 2003, in U.S. Appl. No. 09/691,944.
Amendment After Final and Request for Withdrawal of Finality of Office Action, filed Mar. 12, 2004, in U.S. Appl. No. 09/691,944.
Notice of Allowance issued Apr. 21, 2004, in U.S. Appl. No. 09/691,944.
English-language Derwent Abstract of DE 36 25 418 A1.
English-language Derwent Abstract of EP 0 872 193 B1.
English-language translation of at least a portion of JP 52-171555 (4 pages).
English-language translation of at least a portion of JP 53-20257 (2 pages).
English-language translation of the abstract of JP 2001161436 (1 page).
Notification of the First Office Action issued by the Chinese Patent Office on Jan. 21, 2005, issued in corresponding Chinese patent application No. 02144073.5.
First Office Action issued by the Chinese Patent Office on Jan. 21, 2005, issued in corresponding Chinese patent application No. 02144073.5.

* cited by examiner

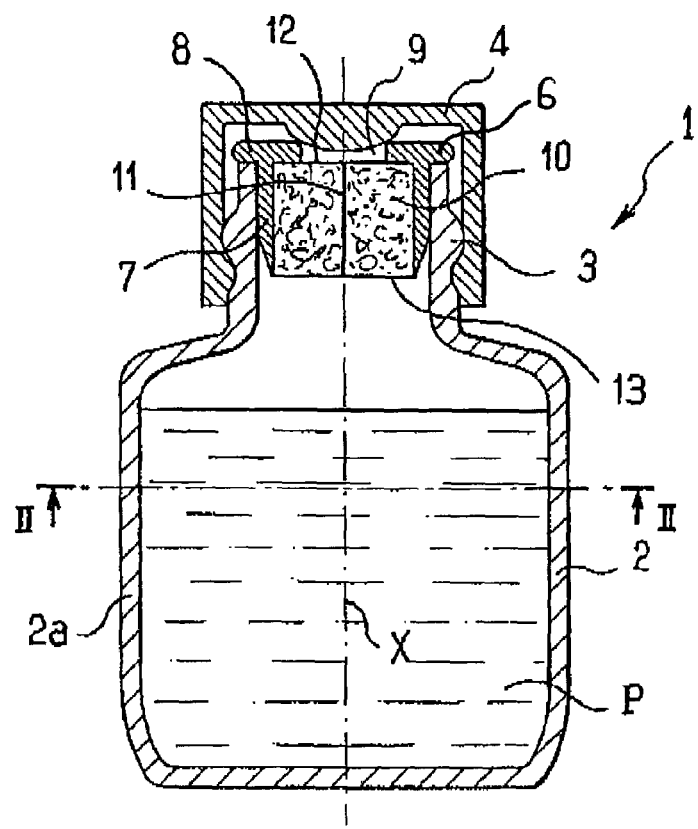
FIG_1
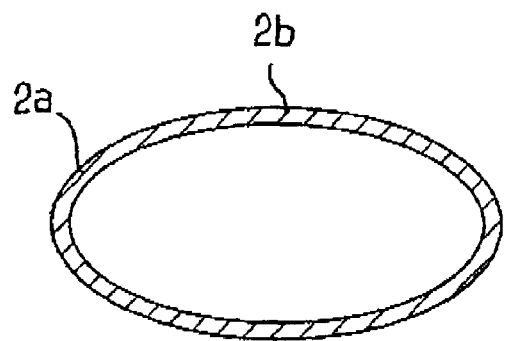
FIG_2
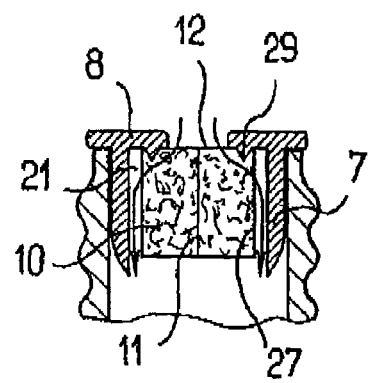
FIG_3
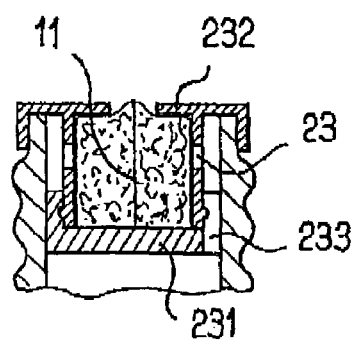
FIG_4

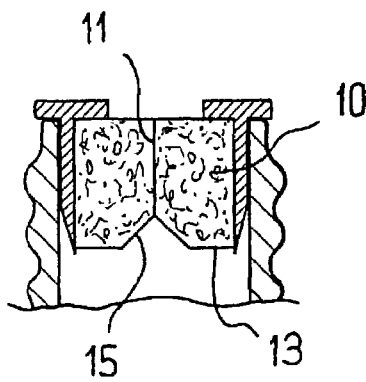
FIG_5
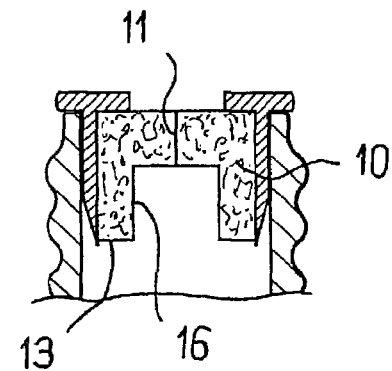
FIG_6
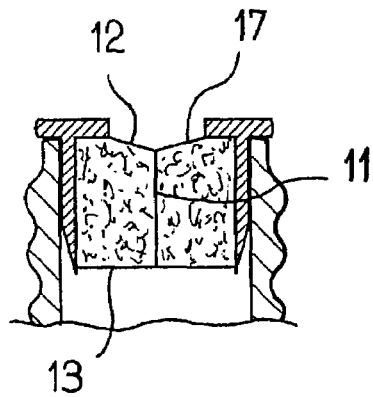
FIG_7
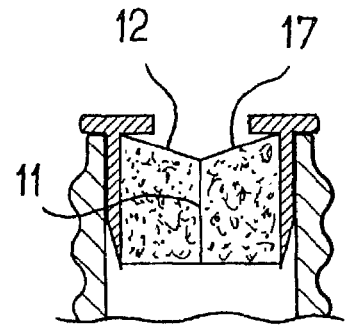
FIG_8
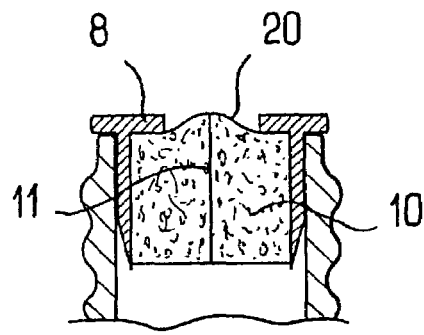
FIG_9
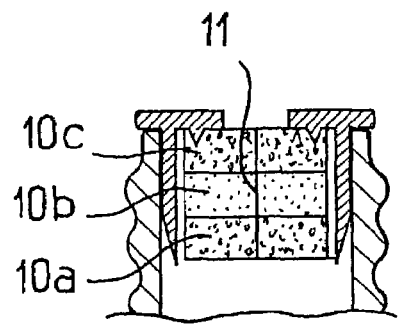
FIG_10

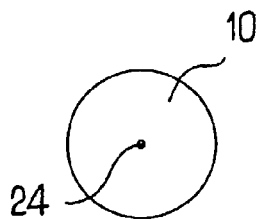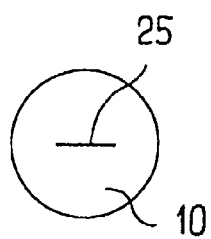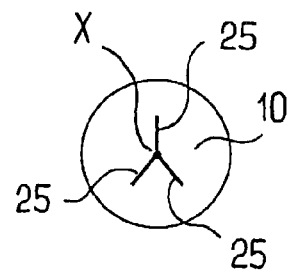
FIG_11  FIG_12  FIG_13
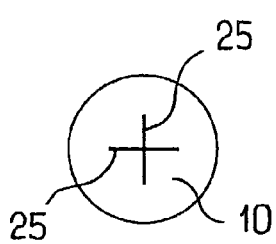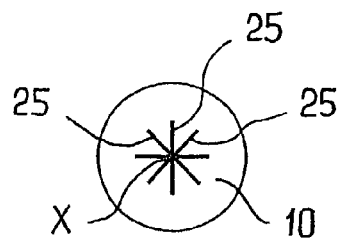
FIG_14  FIG_15
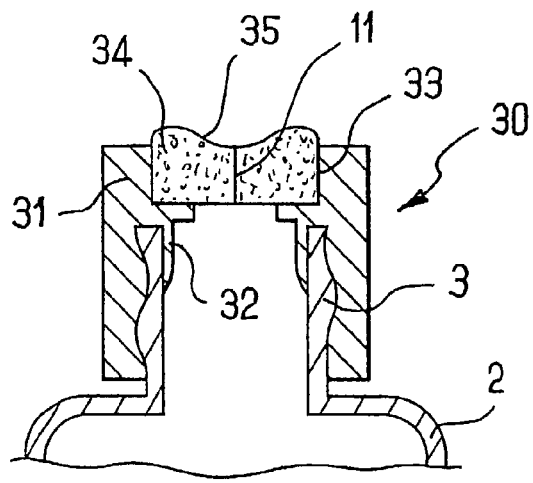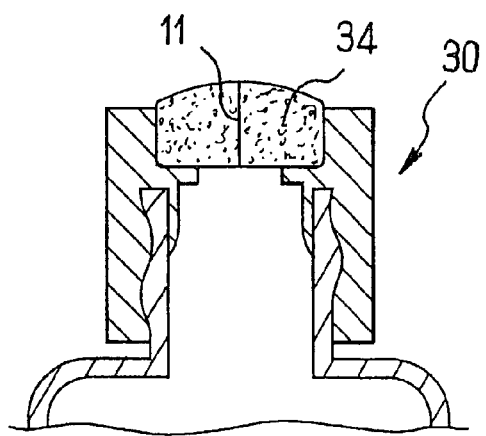
FIG_16  FIG_17

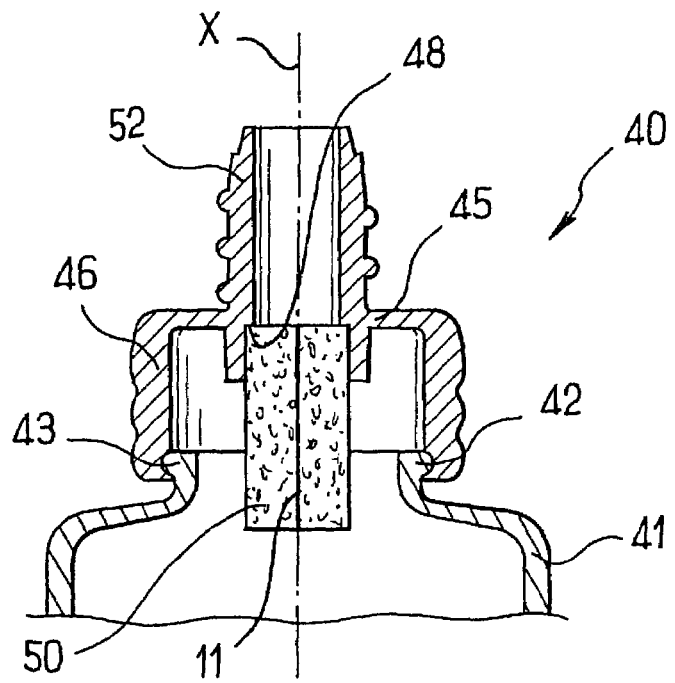
FIG_18
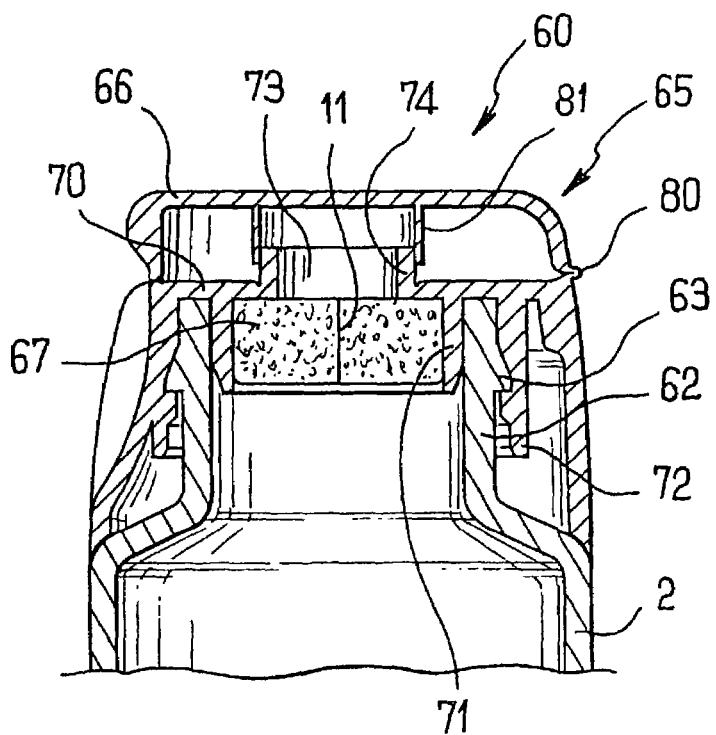
FIG_19

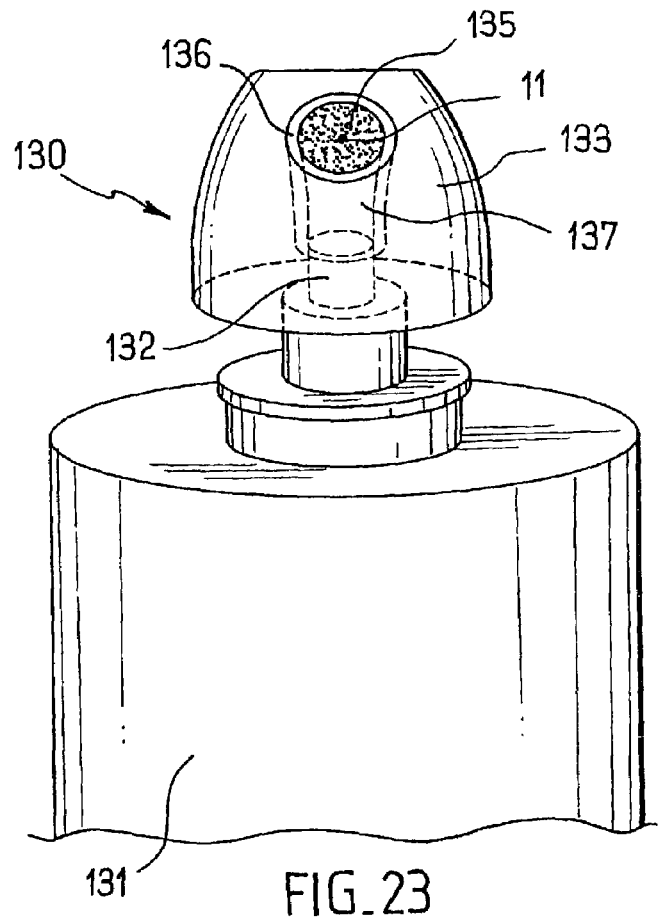
FIG_23
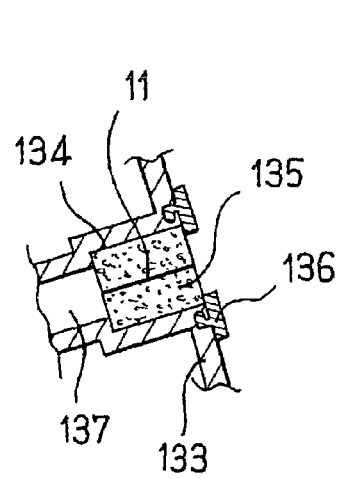
FIG_24
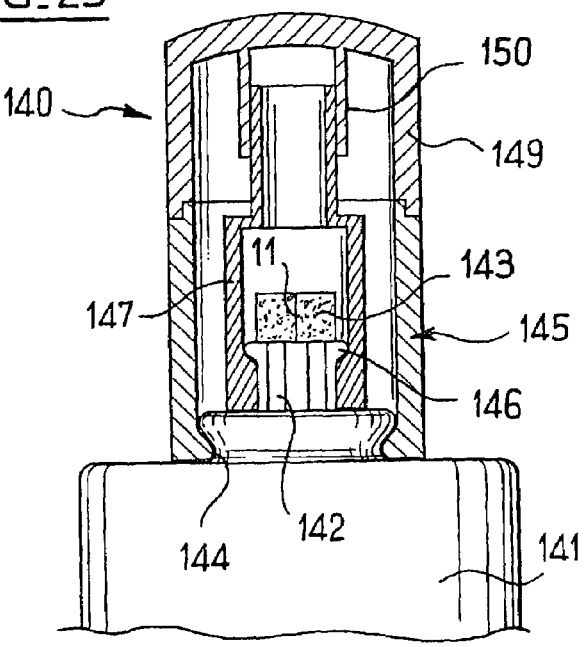
FIG_25

DEVICE AND METHOD FOR DISPENSING A PRODUCT

The present invention relates to a device for dispensing a product, for example, a cosmetic product and/or a care product, such as a product being in liquid or powder form.

In the field of cosmetic products and/or care products, flasks containing liquids, such as, for example, shampoos, may be provided with flow reducers which may serve to slow or substantially prevent the product from escaping, for example, in the event of the flask being accidentally overturned.

For example, U.S. Pat. No. 5,924,605 discloses a dispenser head including a membrane having at least one slot suitable for deflecting into an open position under influence from a substance contained within the flask, and then returning to an initial, closed position when the substance ceases to influence the slot. French Patent No. FR 2 771 078 discloses a dispenser head enabling outflow of a substance. The dispenser head includes a flow reducer having a slot with initially spaced edges that define a width that may be increased, for example, in order to provide a more progressive flow of the substance. Examples of other forms of flow reducers are disclosed in French publication FR-A-2 294 533, and in U.S. Pat. No. 5,186,368. Some other devices may include an applicator for inserting into a receptacle and a wiper member formed from a foam material, as disclosed, for example, in international patent application, WO 97/31553.

U.S. Pat. No. 3,226,762 discloses a device for applying wax which comprises a cylindrical body and a piston that is movable within the body. The wax may be dispensed through a block of foam having a plurality of holes passing therethrough.

One subject of the invention relates to providing a device for dispensing a product that may include a flow reducer. Another subject relates to providing a device that may be relatively simple and inexpensive to produce. Yet another subject of the invention relates to providing a device that may dispense a desired quantity of a product more easily.

In the following description, certain aspects and embodiments will become evident. It should be understood that the invention, in its broadest sense, could be practiced without having one or more features of these aspects and embodiments. It should be understood that these aspects and embodiments are merely exemplary.

In one aspect, as embodied and broadly described herein, the invention includes a device for dispensing a product. The device may include a receptacle including at least one elastically deformable wall configured to be deformed to vary an interior volume of the receptacle, and a flow reducer defining a length and at least one passage. The flow reducer may at least partially include an elastically deformable, compressible material. The at least one passage may be substantially closed at at least one portion of its length when the flow reducer is in a substantially closed, at rest position. The at least one passage may be configured to enlarge when the compressible material is at least partially compressed via the effect of pressure from the product when the interior volume of the receptacle is reduced, thereby enabling dispensing of at least a portion of the product via the at least one passage. The flow reducer may be configured such that the volume of the flow reducer becomes reduced when the at least one passage is enlarged from its substantially closed, at rest position.

The fact that the passage may be substantially closed at rest may render it possible to avoid leakage of a substantial amount of the product, for example, in the event of the receptacle being overturned.

The material (e.g., compressible material) may be compressed when the at least one passage is enlarged, for example, via the effect of pressure from the product (e.g., in directions that are substantially perpendicular to the flow direction of the product). For example, the material of the flow reducer may be cellular or fibrous (e.g., a material including foam (e.g., porous foam) or felt that may be capable of absorbing the product). The elasticity of the material may enable the at least one passage to return to a substantially closed state when the product ceases to be dispensed. For example, the flow reducer may be formed at least partially from a relatively low cost foam material, which may be less expensive than producing an elastomer membrane via dual injection or overmolding. In certain embodiments, using some types of material (e.g., compressible material) may also render it easier to avoid at least some risk of the product escaping suddenly, for example, when the material presents a degree of porosity and deformability. Thus, it may be easier to dispense a desired quantity of the product.

When the at least one passage is closed, the flow reducer may be permeable to air. With a flow reducer that is permeable to air, while the at least one passage is closed, the air permeability of the flow reducer may facilitate air being drawn into the receptacle after a portion of the product has been dispensed. For example, the flow reducer may be formed with open cells. The permeability of the flow reducer to air may also make it easier to fill the receptacle using, for example, a syringe having an endpiece configured to be inserted into the at least one passage, with air being capable of escaping from the receptacle during filling via passage through the flow reducer because of its permeability to air.

The device may include a space configured to allow air to be taken in through a side surface of the flow reducer. For example, the device may include an annular space around the flow reducer. Such a space may facilitate air flow while air is being taken in.

The dimensions of the at least one passage, for example, its length as measured substantially parallel to an axis of the flow reducer, its width, its thickness, and/or its diameter, and/or the density and/or nature of the material may be selected as a function of the desired flow rate. They may also be selected so as to substantially prevent the product flowing under the influence of gravity through the flow reducer in the absence of a reduction in the interior volume of the receptacle.

The flow reducer may include, or may be constituted by, for example, a block of compressible material having a cross-section taken substantially perpendicular to the axis of the at least one passage having a shape selected from: a square shape; a rectangular shape; an oval shape; and a circular shape, although other shapes are contemplated.

According to another aspect, a device for dispensing a product may include a receptacle defining a variable interior volume, and a flow reducer defining a length and at least one passage. The flow reducer may at least partially include an elastically deformable, air permeable, compressible material. The at least one passage may be substantially closed at at least one portion of its length when the flow reducer is in a substantially closed, at rest position. The at least one passage may be configured to enlarge when the compressible material is at least partially compressed via the effect of pressure from the product when the interior volume of the receptacle is reduced, thereby enabling dispensing of at least a portion of the product via the at least one passage. The flow reducer may include at least one setback located adjacent to at least one of the at least one passage (e.g., adjacent the passage outlet) and the interior of the receptacle (e.g., adjacent the passage inlet), wherein the at least one passage opens out into the at least one setback. The setback may include a generally conical shape converging toward the at least one passage.

In still another aspect, a device for dispensing a product may include a receptacle defining a variable interior volume, a flow reducer defining a length, a height, and at least one passage. The flow reducer may at least partially include an elastically deformable, compressible material. The device may include a space defined by at least a portion of the device. The space may at least partially surround the compressible material over at least a portion of the height of the flow reducer. At least a portion of the flow reducer may be in flow communication with the space, and the at least one passage may be substantially closed at at least one portion of its length when the flow reducer is in a substantially closed, at rest position. The at least one passage may be configured to enlarge when said the compressible material is compressed by the product when the interior volume of the receptacle is reduced, thereby enabling dispensing of at least a portion of the product via the at least one passage.

According to yet another aspect, a device for dispensing a product may include a receptacle defining a variable interior volume, and a flow reducer defining a length and at least one passage. The flow reducer may at least partially include an elastically deformable, compressible material. The at least one passage may be substantially closed at at least one portion of its length when the flow reducer is in a substantially closed, at rest position. The passage may be configured to enlarge when the compressible material is compressed by the product when the interior volume of the receptacle is reduced, thereby enabling dispensing of at least a portion of the product via the at least one passage. The flow reducer may be fixed to a portion of the device such that the compressibility of the compressible material when compressed by the product is not substantially limited. The flow reducer may be configured such that the volume of the flow reducer becomes reduced when the at least one passage is enlarged from its substantially closed, at rest position.

In still a further aspect, a device for dispensing a product may include a receptacle including at least one elastically deformable wall configured to be deformed to vary an interior volume of the receptacle, and a flow reducer defining a length and at least one passage. The flow reducer may at least partially include an elastically deformable, compressible material. The at least one passage may be substantially closed at at least one portion of its length when the flow reducer is in a substantially closed, at rest position. The at least one passage may be configured to enlarge when the compressible material is at least partially compressed via the effect of pressure from the product when the interior volume of the receptacle is reduced, thereby enabling dispensing of at least a portion of the product via the at least one passage. The flow reducer may include foam material.

According to yet another aspect, the flow reducer may be configured to substantially prevent the product from flowing from the device via gravity when the receptacle is at least partially inverted.

In still another aspect, the flow reducer may include at least one setback located adjacent to at least one of the at least one passage and the interior of the receptacle, wherein the at least one passage opens out into the at least one setback. In another aspect, the setback may include a generally conical shape converging toward the at least one passage. According to some aspects, the setback may include a generally cylindrical shape, for example, a circularly cylindrical shape. The setback may be located at least partially within the interior of the receptacle. In some aspects, the setback may be located at least partially outside of the receptacle. In still a further aspect, the flow reducer may include at least two setbacks located at substantially opposite ends of the at least one passage. According to another aspect, the flow reducer may have a substantially planar surface, for example, at least on the outside and/or the inside of the receptacle.

In an additional aspect, the flow reducer may include a projection located at least partially outside of the receptacle, the at least one passage opening out through the projection. In another aspect, the flow reducer may include a projection located at least partially within the interior of the receptacle, for example, with the at least one passage opening out in the projection (e.g., the tip of the projection). The projection may be implemented on the outside of the receptacle, for example, in order to act as an applicator and/or in order to interact with an element for closing the receptacle. The projection may also serve to facilitate, for example, directing the product toward the hand of a user.

The height of the flow reducer may be either greater than or equal to the longest dimension of its cross-section, or less than or equal to the longest dimension of its cross-section. The height of the flow reducer may be selected as a function of the head loss that is desired during dispensing, the desired flow rate, and/or the way in which the flow reducer may be mounted on the receptacle.

In another aspect, the flow reducer may include one passage defining a single hole or one passage defining a single slot. The flow reducer may include a plurality of slots having ends, where the plurality of slots may meet at common ends. The flow reducer may include at least two slots, with the at least two slots intersecting (e.g., crossing) at intermediate portions (e.g., the middle of the slots) of the at least two slots. The flow reducer may include at least three slots having a common end, with the at least three slots being substantially uniformly distributed in an angular relationship about an axis of the flow reducer. The flow reducer may include at least one slot defining a varying width. The at least one passage may be formed without removing material from the flow reducer.

The flow reducer may be mounted in a variety of ways. For example, the flow reducer may be fixed via an end face situated on the interior of the receptacle, or turned toward the outside of the receptacle. Such fixing may be achieved, for example, via at least one of adhesive, heat-sealing, clamping, and engaging the flow reducer like a rivet, for example, using one or more additional pieces, which may be at least one of heat-sealed, stuck, and snap-fastened, for example, although other forms of fixing are contemplated. For example, the flow reducer may be fixed to a support wall via a face extending transversely to an axis of the at least one passage. The wall may include at least one annular rib engaged with the flow reducer.

In an additional aspect, the flow reducer may include a block (e.g., a single block) of compressible material (e.g., foam material). The flow reducer may include a multi-layer structure. For example, at least one of the layers of the multi-layer structure may have a density that is different from the density of at least one of the other layers. At least one of the layers of the multi-layer structure may include a material different from a material of at least one of the other layers. Optionally, one of the layers may be air permeable (e.g., facilitate air intake). For example, the at least one passage may include an outlet orifice, and a layer of the multi-layer structure closest to the outlet orifice of the at least one passage may be air permeable (e.g., to facilitate air intake).

According to another aspect, the flow reducer may have a surface configured to apply the product. In some aspects, the device may be configured so that the flow reducer does not include a surface configured to apply a product (e.g., because it may not have any portion that is suitable for contacting a surface to be treated). For example, the flow reducer may be set back from a top surface of the device. The device may then be arranged so as to be capable of dispensing the substance without pressing the flow reducer against a surface outside the device (e.g., the skin).

In still another aspect, the device may include a stopper (e.g., cover, lid, and/or cap, etc.) configured to close the receptacle, wherein the flow reducer may be configured to substantially match the inside shape of the stopper. In some aspects, the flow reducer may be configured to be compressed when the stopper is placed on the receptacle and then expand, for example, when the stopper is withdrawn. Compressing the flow reducer when the stopper is in place may be useful, for example, in reducing the quantities of substance and of air that are stored within the compressible material while the device is not in use.

In an additional aspect, the flow reducer may be fixed in a substantially non-removable manner to the receptacle. For example, the flow reducer may be fixed either directly or indirectly to the receptacle. The receptacle may include a neck and the device may include an insert configured to be fitted into the neck of the receptacle, wherein the flow reducer may be fixed to the insert. In some aspects, the flow reducer may be fixed on a support which may be configured to be movable relative to the body of the receptacle, where a portion of a closure member, for example, may include the support. For example, the neck of the receptacle may be threaded in order to enable a stopper to be rotated into place. The receptacle may include a capsule connected to a body of the receptacle via a hinge. In some aspects, the flow reducer may be fixed either directly or indirectly to the capsule. On being removed from the neck of the receptacle, the capsule may make it easier to fill the receptacle.

According to another aspect, the flow reducer may include at least one face at least partially covered by at least one of a flocking and one of a woven fabric and a non-woven fabric, for example, to make the flow reducer more comfortable when applying product and/or more appealing in appearance.

In another aspect, the flow reducer may be configured to be air permeable, for example, so as to enable intake of air. For example, the flow reducer may include an open-cell foam. At least one of the flow reducer and the receptacle may be configured to define a space enabling air to enter the device via a side surface of the flow reducer. For example, the space may include an annular space around the flow reducer.

In an additional aspect, the interior volume of the receptacle may be capable of being reduced in response to action taken by a user. For example, the at least one elastically deformable wall may be configured to be squeezed by a user in order to reduce the interior volume of the receptacle. The receptacle may be configured to return to its initial shape once it has been released by the user.

In another aspect, the receptacle may define a generally elongate cross-section. For example, the receptacle may define a generally oval-shaped cross-section. The receptacle may include at least two faces configured to be squeezed together by the user in order to reduce the interior volume of the receptacle, and the receptacle may be configured to be sufficiently deformable to enable the at least two faces to contact each other when the user squeezes the receptacle with sufficient pressure.

According to another aspect, the device may include a shutter mechanism, for example, in order to substantially prevent product from being dispensed in the event of pressure being inadvertently applied to the receptacle. The mechanism may include a movable shutter element, for example, an element that may be movable in translation or in rotation. Such a shutter mechanism may make it possible to avoid using a stopper.

According to another aspect, the device for dispensing a product may include a shutter element which may be configured to be movable relative to the body of the receptacle, wherein the flow reducer may be fixed to the shutter element. The shutter element may be movable between a first position configured to enable a product to exit the receptacle, and a second position configured to substantially prevent the product from exiting the receptacle. The flow reducer may be located downstream from the shutter element relative to a direction of flow of the product when exiting the receptacle. In some aspects, the flow reducer may be located upstream. The receptacle may include a shutter element configured to move via rotating (and/or translating) relative to a body of the receptacle, and the shutter element may be configured to selectively interrupt exit of a product from the receptacle. According to some aspects, the shutter element may serve to selectively interrupt the outward flow of product contained in the receptacle, either toward its outlet or toward the flow reducer, for example, if the flow reducer is located on the path followed by the product to reach the outlet.

In some aspects, the device for dispensing a product need not be provided with a closure member configured to separate the flow reducer from the outside.

According to another aspect, the interior volume of the receptacle may range from about 50 milliliters to about 600 milliliters. For example, the interior volume of the receptacle may range from about 200 milliliters to about 600 milliliters. The device may include at least one of a cosmetic product and a care product contained in the receptacle. For example, the product may include at least one of a shower gel, a shampoo, a body lotion, and an oil, although other products are contemplated. The product may be dispensed by reducing the inside volume of the receptacle without inserting an applicator element into the receptacle through the flow reducer (e.g., without using the flow reducer as a wiper for an applicator passing through the flow reducer).

According to another aspect, the flow reducer may include at least one material selected from materials that are cellular, materials that are fibrous, composites, multi-layer composites, felts, polyurethanes, polyesters, polyethers, polyvinylchlorides (PVCs), nitril butyl rubber (NBR) foams, and NBRs. In some aspects, the flow reducer may include properties of being hydrophilic or hydrophobic. The flow reducer may include a filler comprising at least one biocidal agent (e.g., metallic salts). The flow reducer may include a filler comprising at least one of magnetic particles and magnetizable particles.

In still another aspect, the device for dispensing a product may include a housing that may at least partially define a fixed volume, wherein the flow reducer may be located in the housing. In some aspects, the device may define a housing that may at least partially define a variable volume, wherein the flow reducer may be located in the housing.

In an additional aspect, a method for dispensing at least one of a cosmetic product and a care product may include providing a device for dispensing a product, and reducing the interior volume of the receptacle such that the pressure from the product compresses the compressible material, thereby enlarging the at least one passage such that at least a portion of the product is dispensed via the at least one passage. Reducing the interior volume of the receptacle may include squeezing the receptacle. The method for dispensing may include applying the product to at least one of skin and hair.

The term "providing" is used in a broad sense, and refers to, but is not limited to, making available for use, enabling usage, giving, supplying, obtaining, getting a hold of, acquiring, purchasing, selling, distributing, possessing, making ready for use, and/or placing in a position ready for use.

Aside from the structural and procedural arrangements set forth above, the invention could include a number of other arrangements, such as those explained hereinafter. It is to be understood, that both the foregoing description and the following description are exemplary.

The accompanying drawings are incorporated in and constitute a part of this specification. The drawings illustrate exemplary embodiments of the invention and, together with the description, serve to explain some principles of the invention. In the drawings, FIG. 1 is a schematic cross-section view of an embodiment of a device for dispensing a product;

FIG. 2 is a cross-section view taken along line II-II of FIG. 1;

FIG. 3 is a partial, schematic cross-section view of an embodiment of a flow reducer;

FIG. 4 is a partial, schematic cross-section view of another embodiment of a flow reducer;

FIG. 5 is a partial, schematic cross-section view of a further embodiment of a flow reducer;

FIG. 6 is a partial, schematic cross-section view of another embodiment of a flow reducer;

FIG. 7 is a partial, schematic cross-section view of a further embodiment of a flow reducer;

FIG. 8 is a partial, schematic cross-section view of another embodiment of a flow reducer;

FIG. 9 is a partial, schematic cross-section view of a further embodiment of a flow reducer;

FIG. 10 is a partial, schematic cross-section view of another embodiment of a flow reducer;

FIG. 11 is a schematic plan view of an embodiment of a flow reducer;

FIG. 12 is a schematic plan view of another embodiment of a flow reducer;

FIG. 13 is a schematic plan view of further embodiment of a flow reducer;

FIG. 14 is a schematic plan view of another embodiment of a flow reducer;

FIG. 15 is a schematic plan view of a further embodiment of a flow reducer;

FIG. 16 is a partial, schematic cross-section view of another embodiment of a flow reducer;

FIG. 17 is a partial, schematic cross-section view of a further embodiment of a flow reducer;

FIG. 18 is a partial, schematic cross-section view of another embodiment of a device for dispensing a product;

FIG. 19 is a partial, schematic cross-section view of a further embodiment of a device for dispensing a product;

FIG. 23 is a partial perspective view of another embodiment of a device for dispensing a product;

FIG. 24 is a partial, schematic cross-section view of an embodiment of a flow reducer shown in FIG. 23;

FIG. 25 is a partial, schematic cross-section view of another embodiment of a device for dispensing a product;

Reference will now be made in detail to some possible embodiments of the invention, examples of which are illustrated in the accompanying drawings. Wherever possible, the same reference numbers are used in the drawings and the description to refer to the same or like parts.

Figure 20:
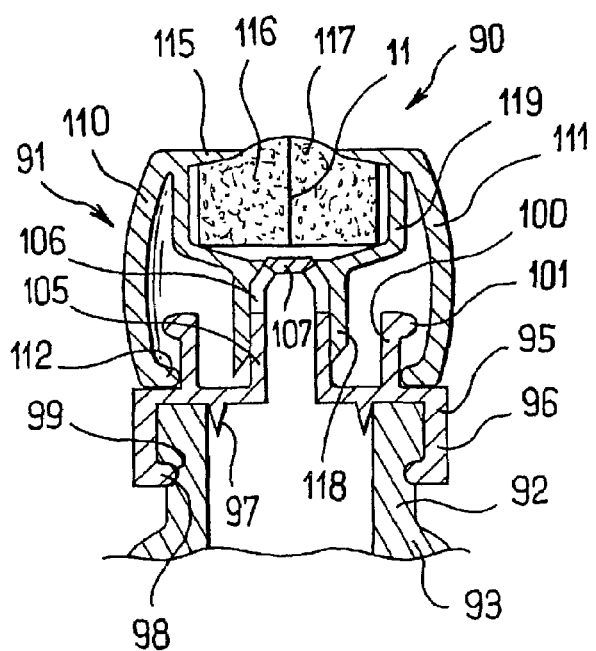
FIG. 20 is a partial, schematic cross-section view of another embodiment of a device for dispensing a product.

The exemplary embodiment of a device 1 depicted in FIG. 1 may include a receptacle 2 defining an axis X, and a top having a neck 3, for example, provided with thread(s) configured to receive a closure cap 4 which may also be provided with threads. (Structure other than threads may be used for securing the closure cap 4 to the receptacle 2).

The receptacle 2 may contain, for example, a product P (e.g., a liquid such as, for example, a shower gel, a shampoo, a body lotion, or an oil). The invention is not limited to any particular product, and the product need not be in liquid form. The product could have other forms, for example, a powder form.

In one exemplary embodiment, the receptacle 2 may include a body having at least one wall, for example, a tubular wall 2a presenting a substantially oval cross-section, as shown in FIG. 2, thereby defining two main faces 2b and 2c. The at least one wall may be formed of an elastically deformable plastics material, although other materials are contemplated. In the exemplary embodiment depicted in FIG. 1, the receptacle 2 has a flat bottom.

The user may reduce the interior volume of the receptacle 2, for example, by squeezing the exemplary tubular wall 2a by pressing fingers against the two main faces 2b and 2c. During such compression, the opposite portions of the tubular wall 2a which define the main faces 2b and 2c may be brought into contact with each other, for example, if the tubular wall 2a is sufficiently flexible. When the tubular wall 2a is released, the receptacle 2 may tend to return in at least a somewhat elastic fashion to its initial shape.

In the exemplary embodiment shown in FIG. 1, the neck 3 may receive an insert 6 which may include a skirt 7 (e.g., a tubular skirt) that may be located in the neck 3. The skirt 7 and the neck 3 may be configured such the skirt 7 engages the neck 3 via, for example, a force fit that may result in a substantially leak-tight fit with an inside portion of the neck 3, although other structural arrangements may be used which tend to hold the skirt 7 in place in the neck 3 in a substantially leak-tight manner. The skirt 7 may be connected to a plate 8 that may include an outlet orifice 9 (e.g., a centrally located outlet orifice). The plate 8 may include a periphery that rests against a top end surface of the neck 3. The device 1 may include a flow reducer 10 which may be formed of a foam material. For example, the flow reducer may present a shape that is substantially cylindrical (e.g., circularly cylindrical) about the axis X. Its top face 12 may be fixed to the plate 8 of the insert 6. In some exemplary embodiments, the flow reducer 10 may be fixed to the skirt 7. For example, the flow reducer 10 may be fixed to the insert 6 by adhesive and/or by heat-sealing, although other constructions are contemplated.

In the exemplary embodiment shown in FIG. 1, the flow reducer 10 may include a foam element (e.g., a single block formed from polyurethanes, polyesters, polyethers, of polyvinylchlorides (PVCs), and/or nitril butyl rubber foams (NBFs), although this list is not exhaustive). In general, any of the exemplary foams discussed may have cells that are open, semi-open, and/or closed, or any combination thereof. An open-cell foam may facilitate the intake of air while the receptacle 2 is returning to its initial volume.

The flow reducer 10 may include a passage 11 which may be substantially closed at at least one point across its width when the flow reducer 10 is in a substantially closed, at rest position, and which may be configured to enlarge when the material (e.g., a compressible material) is at least partially compressed via the effect of pressure from the product P when the interior volume of the receptacle 2 is reduced. For example, the passage 11 may include a single hole 24 which may be located substantially along the axis X, as shown in FIG. 11. In some embodiments, the flow reducer 10 may include one or more slots instead of hole(s). For example, the flow reducer 10 depicted in FIG. 12 includes a single slot 25. In some embodiments, the one or more slots 25 may have edges that are substantially rectilinear and which may substantially contact each other at rest. For example, edges of the slot(s) 25 lie substantially along a diameter (e.g., when the flow reducer 10 defines a substantially circular cross-section), for example, with a center of the slot(s) 25 coinciding with the axis X of the flow reducer 10. The slot(s) 25 may extend substantially along an entire diameter or along only a fraction of the diameter. In the exemplary embodiment depicted in FIG. 13, the flow reducer 10 may include three slots 25 which may share a common end coinciding with the axis X. The slots may be arranged such that they are separated by substantially equal angles with respect to the axis X, for example.

In some member, the flow member 10 may include two slots 25 that may be mutually perpendicular and that may cross at locations intermediate their ends, for example, as shown in FIG. 14. Some embodiments may include more than two slots. For example, as shown in FIG. 15, the flow reducer 10 may include three slots 25 that cross at locations intermediate their ends and that are separated by substantially equal angles with respect to the axis X. Other forms of passage(s) 11 may also be provided in the flow reducer 10. For example, combinations of holes (e.g., circular holes) and/or of slots may be provided in the flow reducer 10. Such passage(s) 11 may be formed with or without removing material from the flow reducer 10.

In the exemplary embodiment depicted in FIG. 1, the flow reducer 10 is configured to have a height that is smaller than the dimension (e.g., diameter) of its cross-section, and the top face 12 of the flow reducer 10 is set back from the top surface of the insert 6. The top and bottom faces 12 and 13 of the flow reducer 10 may be substantially planar. A side surface of the flow reducer 10 may be in contact with the inside surface of the skirt 7.

In some embodiments, a space 21 may be provided between a side surface 27 of the flow reducer 10 and the skirt 7, as shown in FIG. 3. Such a configuration may assist the intake of air into portions of the device 1. In the exemplary embodiment of FIG. 3, the space 21 is annular, but other shapes, for example, channel shapes having semicircular or other shaped cross-sections, may be provided. In the exemplary embodiment depicted in FIG. 3, the flow reducer 10 has its top face fixed beneath the plate 8. The insert 6 may be provided with one or more annular ribs 29 extending beneath the plate 8. The rib(s) 29 may be heated so as to attach the flow reducer 10 to the insert via heat-sealing. In the embodiment shown in FIG. 3, air may flow through the side surface 27 so as to reach the space 21, for example, in situations in which air enters portions of the device 1.

In some embodiments, product P may be able to penetrate into the flow reducer 10 other than through passage 11, as shown in FIG. 4. FIG. 4 depicts an embodiment in which the flow reducer 10 is received in a cage having side openings 23. The cage may include parts (e.g., two parts 231 and 232) which may be snap-fastened together, although alternative configurations may be used for fastening the two or more parts together. In the exemplary embodiment shown in FIG. 4, the part 231 may define the bottom of the housing containing the flow reducer 10 and may include openings 233 which may allow at least a portion of the product P contained in the receptacle 2 to reach the openings 23. In some embodiments (not shown) the bottom wall of the part 231 may include an orifice.

The configuration of the flow reducer 10 is not limited to any particular shape and its bottom face 13 (e.g., the face that faces toward the interior volume of the receptacle 2) may include a setback 15, and the passage 11 may open out into the top of the setback 15. For example, the setback 15 may be generally conical in shape (e.g., converging toward the passage 11) or may be substantially cylindrical in shape (e.g., circularly cylindrical), as shown at 16 in FIG. 6. The shape of the setback 15, however, may be selected as a function of various considerations including, for example, the nature of the product P and/or the desired flow rate.

Some embodiments may include a bottom face 13 which is planar and a top face 12 which may include a setback 17 (e.g., a setback having a generally conical shape converging toward the passage 11), as shown in FIG. 7. Some embodiments of the setback 17 may occupy only a portion of the top face 12, as shown in FIG. 7, while some embodiments may cover the entire top surface 12, as shown in FIG. 8. For example, the setback 17 may enable a user to see the product P begin to exit the flow reducer 10 prior to the product P leaving the insert 6 (e.g., when the receptacle 2 is in an upright position (e.g., head-up position)). In such examples of a setback 17, the setback 17 may serve, for example, to make it easier to fill the receptacle 2 by means of a syringe which includes an end-piece that may be engaged with the passage 11. The setback 17 may render it easier to drain the product P back into the passage 11 (e.g., if the receptacle 2 is in an upright position when the syringe is removed from the flow reducer 10).

The presence of one or more setbacks may render it easier to open the passage 11 under pressure from the product P. For example, it may render it easier to separate the edges of the slot(s) (e.g., when the passage 11 includes one or more slots 25).

In the exemplary embodiment depicted in FIG. 9, the flow reducer 10 may include one or more projections 20 on either or both of its bottom face 13 (not shown) and top face 12 (e.g., with the passage 11 opening out through a tip of the projection 20). Such a projection 20 may, for example, channel at least a portion of the product P toward the outlet 9 of the insert 6. The projection 20 may be formed, for example, by pressing the flow reducer 10 (e.g., when the flow reducer 10 is formed of foam material) against the plate 8 while the flow reducer 10 is being fixed in the insert 6.

In some embodiments of the device, the flow reducer 10 may be formed as a multi-layer structure. For example, the exemplary embodiment shown in FIG. 10 includes a plurality of layers 10a, 10b, and 10c, which may be superposed, for example, in a direction substantially parallel to the direction of the axis X (e.g., with each of the layers 10a, 10b, and 10c being formed from different materials). In some embodiments, some of the layers 10a, 10b, and 10c may be formed from the same material. The layers 10a, 10b, and 10c may have different densities. For example, the layer 10c (e.g., the layer closest to the outlet orifice) may have the lowest density, thereby facilitating air ingress during intake of air, for example, with a space (e.g., a space 21) for transferring air being provided around the flow reducer 10, as shown in FIG. 3. The layer 10c may render it possible to use a material that is easier to assemble with the insert 6 (e.g., to the plate 8 of the insert 6). The number of layers that are superposed is variable. For example, the flow reducer may include two, three, four, or more layers. The material(s) and/or layer(s) forming the flow reducer 10 and the characteristics of the passage(s) 11 may be selected in such a manner so as to substantially ensure that the product P does not flow out through the flow reducer 10 under the influence gravity (e.g., when the device is overturned).

The flow reducer may be fixed to the receptacle 2 other than by means of an insert 6 inserted into the neck 3 of the receptacle 2. For example, the exemplary embodiment of the device 30 partially depicted in FIG. 16 may include a receptacle 2 having a neck 3 (e.g., a threaded neck)-onto which a capsule 31 may be mounted (e.g., via rotating in embodiments having screw threads). In some embodiments (not shown) the capsule 31 may be snap-fastened onto the neck 3 of the receptacle 2. The capsule 31 may include a lip 32 (e.g., a bottom sealing lip) that presses against the inside wall of the neck 3. The top portion of the capsule 31 may define a housing 33 for receiving a flow reducer 34 which is fixed to the capsule 31 (e.g., via its bottom face (e.g., a face facing toward the interior of the receptacle 2)). The flow reducer 34 may project beyond the capsule 31, for example, as shown in FIG. 16, and may include a relief portion 35 on its top face, thereby defining a setback.

The flow reducer 34 may include at least one passage 11 which may form one or more holes and/or slots. For example, a passage 11 may open out in substantially the middle of the setback.

The device 30 need not have a closure cap, and the flow reducer 34 may be configured in such a manner so as to substantially prevent the product P from flowing out from the receptacle 2, for example, under the influence of gravity, and may thus provide a substantially leak-tight closure (e.g., when the flow reducer 34 is in a substantially closed, at rest position). The material(s) forming the flow reducer 34 may, for example, have closed cells.

For some embodiments in which the flow reducer 34 projects beyond the capsule 31, the portion which projects beyond the capsule 31 may have a configuration other than the exemplary embodiment shown in FIG. 16. For example, the flow reducer may include a portion that bulges outwardly, as shown in FIG. 17. In the exemplary embodiment shown in FIG. 17, the flow reducer 34 presents an outwardly directed, convex projection. Such a projection may serve to channel the product P passing therethrough.

FIG. 18 depicts an exemplary embodiment of a device 40 that may include a receptacle 41 provided at one end with a neck 42 that may terminate in an annular bead 43. The device 40 includes a capsule 45 that may include a bottom skirt 46 which may be fixed onto the above-mentioned bead 43 via snap-fastening (e.g., when the neck 42 includes an annular bead 43). The capsule 45 may include an inside lip 48 projecting downwards and serving to position and hold the flow reducer 50. The inside lip 48 may be cylindrical in shape and may have an axis that is substantially parallel to axis X. The flow reducer 50 may include one or more passages 11, for example, one or more holes and/or one or more slots. The capsule 45 may include an endpiece 52 which may optionally serve to mount a closure cap (not shown) (e.g., in embodiments that include a closure cap).

In the exemplary embodiment described, the flow reducer 50 may have a height that is greater than its diameter (e.g., in embodiments having a substantially circular cross-section). The flow reducer 50 may be substantially unconstrained over a major portion of its height, and its length may be greater than that the length of the lip 48.

FIG. 19 depicts an exemplary embodiment of a device 60 that may include a receptacle 2 having at least one compressible wall. The receptacle 2 may include a neck 62 that may be provided with a bead 63 (e.g., for snap-fastening). A dispensing capsule 65 may be fixed to the receptacle 2, and the capsule 65 may include a cover 66 (e.g., a hinged flap) and a flow reducer 67 having at least one passage 11 (e.g., one or more holes and/or one or more slots). The capsule 65 may include a plate 70 having a lip 71 (e.g., a sealing lip) carried on a side of the plate facing toward the interior of the receptacle 2 for pressing against the inside wall of the neck 62. An assembly skirt 72 substantially concentric about the skirt 71, for example, may be snapped onto the neck 62 (e.g., via engagement with bead 63). The plate 70 may include a dispensing opening 73 defined by an upwardly directed wall 74 (e.g., a cylindrical wall). The cover 66 may be connected to the plate 70 via a film hinge 80. A lip 81 (e.g., an annular sealing lip) may be included on the cover 66 so as to abut against the wall 74 when the cover 66 is closed. The flow reducer 67 may be housed in an interior space substantially defined by the lip 71. The flow reducer 67 may be fixed, for example, via its top face to the plate 70.

FIG. 20 depicts an exemplary embodiment of a device 90 including a receptacle 93 having a wall (e.g., a compressible wall) having a neck 92 and a shutter 91 mounted thereto (e.g., via snap-fastening). The shutter 91 may include a bottom portion 95 provided with an assembly skirt 96 and an annular lip 97 (e.g., a sealing lip) abutting the interior wall of the neck 92. The assembly skirt 96 may include an annular bead 98 configured to be fastened (e.g., snap-fastened) to an annular rim 99 of the neck 92. The bottom portion 95 may include a tubular wall 100 that extends upward (e.g., with its top end carrying an annular bead 101). The wall 100 may substantially surround a chimney 105 having side passages 106, for example, in the vicinity of its top end. The chimney 105 may include a substantially frustoconical top portion. The shutter 91 may include a top portion 110 that is movable relative to the bottom portion 95 (e.g., between a low, shutting position, and a high, dispensing position). The top portion 110 may include an outside skirt 111 configured to be moved axially by the user, with a bottom end thereof having an annular bead 112 for engaging beneath the annular bead 101. The top portion 110 may thus be retained on the bottom portion 95. The top portion 110 may include a transversely-extending wall 115 provided with an opening, with a flow reducer 116 located beneath the wall 115. On a side facing toward the outside of the receptacle 93, the flow reducer 116 may include a projection 117 at least partially projecting through the opening in the wall 115. The wall 115 may be molded, for example, in a substantially vertical orientation and, after the flow reducer 116 has been positioned in the shutter 91, the wall 115 may be folded down while still cooling such that it extends substantially radially inward. The top portion 110 may include a shutter skirt 118 that may be configured to bear, for example, in a substantially leak-tight manner against the chimney 105 to close the side passage(s) 106 when the shutter 91 is in its closed position, as shown in FIG. 20. The skirt 118 may be connected to the transverse wall 115 via a wall 119 that may include a substantially frustoconical orifice (e.g., centrally located) having a shape that substantially matches the shape of the top end of the chimney 105.

In order to dispense a product P, for example, the user may reposition (e.g., raise) the top portion 110. The annular bead 112 abuts against the annular bead 101 such that the skirt 118 no longer closes off the passage(s) 106, thus opening passage (s) 106, thereby enabling the product P contained in the receptacle 93 to flow through the passage(s) 106 toward the flow reducer 116. After use, the user may reposition (e.g., push down) the top portion 110 so as to move the shutter 91 into its closed position. It is also contemplated that the shutter 91 may be configured such that the passage(s) 106 could be opened via pushing the shutter 91 down, and closed via raising the shutter 91.

Figure 21:
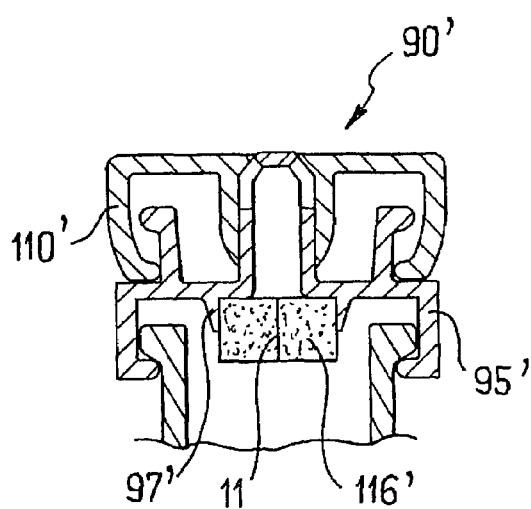
FIG. 21 is a partial, schematic cross-section view of a further embodiment of a device for dispensing a product.

FIG. 21 depicts an exemplary embodiment of a device 90' that may include a flow reducer 116' that is not fixed to the top portion 110' of the shutter 91'. For example, the flow reducer 116' may be attached to the bottom portion 95' of the shutter 91' (e.g., the flow reducer 116' may be attached to an inside of a lip 97').

Figure 22:
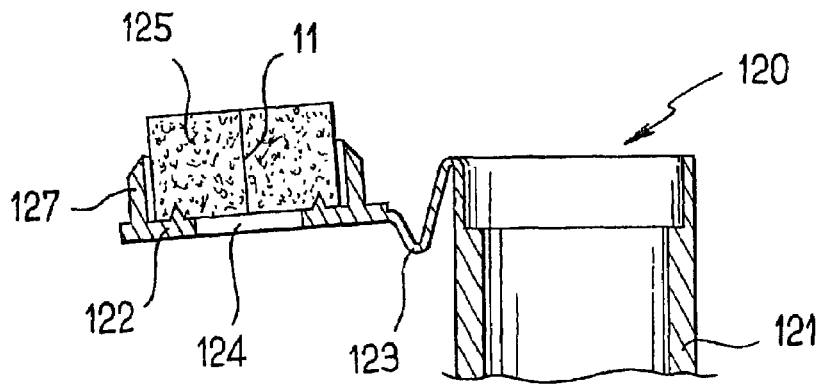
FIG. 22 is a partial, schematic cross-section view of a further embodiment of a device for dispensing a product.

FIG. 22 depicts an exemplary embodiment of a device 120 that may include a neck 121 communicating with the interior of a receptacle (not shown). The neck 121 may be connected to a capsule 122 via a hinge 123 (e.g., a film hinge). The capsule 122 may include a skirt 127 configured to abut the inside wall of the neck 121, for example, when the capsule 122 is in the closed position.

The capsule 122 may include a flow reducer 125 such that the flow reducer 125 faces toward the interior of the receptacle when the capsule 122 is in the closed position. The capsule 122 may include a dispensing orifice 124 in flow communication with at least one passage 11 that may be located in the flow reducer 125. In embodiments having the flow reducer 125 fixed to the capsule 122, it may be relatively easy to fill the receptacle via its neck 121 while the capsule 122 is in its open position, as shown in FIG. 22.

FIG. 23 depicts an exemplary embodiment of a device 130 that may include a receptacle 131 having a wall (e.g., a compressible wall) and an endpiece 132 including a dispensing capsule 133 mounted thereon. The dispensing capsule 133 may include a housing 134 for receiving a flow reducer 135, as shown in FIG. 24. The housing 134 may be in flow communication with the endpiece 132 via a duct 137 extending inside the capsule 133. The flow reducer 135 may be held in the housing 134 by, for example, a ring 136 fixed to the capsule 133 via, for example, snap-fastening.

FIG. 25 depicts an exemplary embodiment of a device 140 that includes a receptacle 141 that may be provided with a neck 142 and a flow reducer 143. The receptacle 141 may include a portion of reduced dimension 144 enabling a capsule 145 to be secured thereto. The neck 142 may be provided with an bead 146 (e.g., an annular bead) for fixing, for example, a dispensing endpiece 147 to the neck 142 (e.g., via snap-fastening). The capsule 145 may include a closure cap 149 provided with an inside skirt 150 (e.g., a sealing skirt) suitable for abutting the endpiece 147.

In some embodiments, the flow reducer may be set back from an edge of a wall (e.g., a rigid wall) of the device and, in at least in some instances, may not be used to apply the product P. In some other embodiments, however, the flow reducer may be configured to serve as an applicator for the product P, for example, by being brought into contact with the skin.

Figure 26:
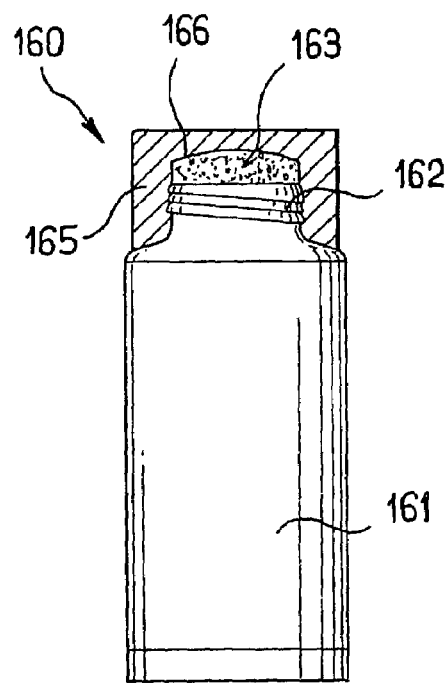
FIG. 26 is a partial, schematic cross-section view of another embodiment of a device for dispensing a product in a first condition.
Figure 27:
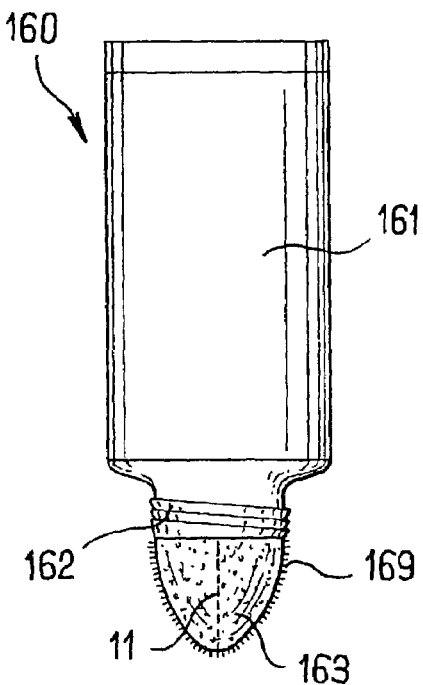
FIG. 27 is a view of the device of FIG. 26 in a second condition.

For example, FIGS. 26 and 27 depict an exemplary embodiment of a device 160 which may include a flow reducer 163 shaped in such a manner so as to be suitable for being brought into contact with the skin. The device 160 may include a receptacle 161 in the form of a tube, for example, a tube having a compressible wall and a threaded neck 162 with which the flow reducer 163 may be at least partially engaged. The flow reducer 163 may include at least one passage 11 which passes therethrough. The receptacle 161 may be be closed by a cap 165 which defines an interior cavity 166. The volume of the interior cavity 166 may be smaller than the volume of the flow reducer 163 which may at least partially project beyond the neck 162 such that when the cap 165 is mounted (e.g., via threading onto a screw thread) onto the neck 162, the flow reducer 163 may be at least partially compressed and may thereafter match the shape of the interior cavity 166 of the cap 165. When the cap 165 is removed, for example, in order to allow the device 160 to be used in a substantially inverted orientation (e.g., head-down position), as shown in FIG. 27, the flow reducer 163, which may be configured to exhibit shape memory, may expand so as to return to its initial shape. The flow reducer 163 may include a covering 169 on its surface such as flocking and/or a woven or a non-woven fabric in order, for example, to make application of product P more comfortable.

Figure 28:
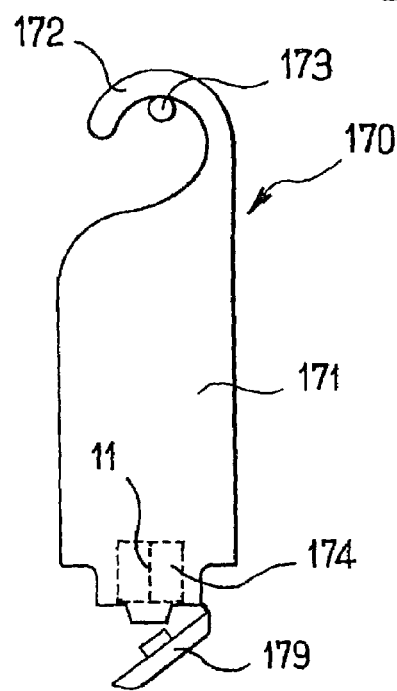
FIG. 28 is a view of another embodiment of a device for dispensing a product.

FIG. 28 depicts an exemplary embodiment of a device 170 that includes receptacle 171 having one end configured to form a hook 172 so as to enable, for example, the device 170 to be hooked onto a support 173 so that it hangs in a substantially inverted orientation. At the end remote from the hook 172, the device 170 may include a flow reducer 174 having at least one passage 11. The material and/or configuration of the flow reducer 174 may be selected such that product P is substantially prevented from leaking out of the device 170 under the influence of gravity. A closure cap 179 may be connected to the body of the receptacle 171, for example, via a hinge (e.g., a film hinge) for closing an outlet orifice when the device 170 is not in use.

In the exemplary embodiment shown in FIG. 20, the shutter 91 may be configured to be moved from its closed position to its dispensing position by moving the moving part in an axial fashion. In some embodiments, the device may be provided with a shutter which includes a portion that can be rotated so as to move from a closed position to a dispensing position.

Figure 29:
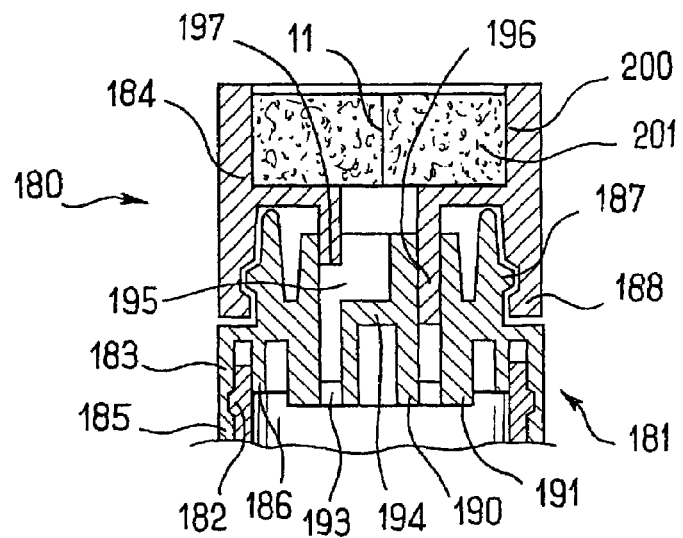
FIG. 29 is a partial, schematic cross-section view of another embodiment of a device for dispensing a product.

For example, FIG. 29 depicts an exemplary embodiment of a device 180 that may be provided with a shutter mechanism 181 that includes a bottom portion 183 for fixing on the neck 182 of a receptacle (not shown), and a top portion 184 configured to be rotated relative to the bottom portion 183 in order to move the shutter mechanism 181 between a closed position and a dispensing position. The bottom portion 183 may include an assembly skirt 185 (e.g., threaded onto the neck 182) and a sealing lip 186 abutting in a substantially leak-tight manner against the inside surface of the neck 182. The bottom portion 183 may also include an inside skirt 187 against which an outside skirt 188 of the top portion 184 may be fastened (e.g., snap-fastened). The bottom portion 183 may have walls 190 and 191 (e.g., concentric tubular walls)

interconnected by bridges of material that may define openings 193 between the walls 190 and 191, with the wall 190 being substantially closed at an intermediate height by a transverse wall 194, with a lateral opening 195 provided above the transverse wall 194. The top portion 184 may include a wall 196 (e.g., a tubular wall) extending between the walls 190 and 191. The wall 196 may include a lateral opening 197 which can be substantially aligned with the lateral opening 195, for example, when the top portion 184 rotated into its dispensing position. The product P may then flow between the walls 190 and 191, through the lateral openings 195 and 197, and into the inside of the wall 196, above the transverse wall 194. When the top portion 184 is in its closed position, the wall 196 may close the lateral openings 195 and 197, thereby closing the receptacle. The top portion 184 may define a housing 200 for enabling a flow reducer 201 (e.g., including at least one passage 11 formed in, for example, a foam material) to be received therein.

Figure 30:
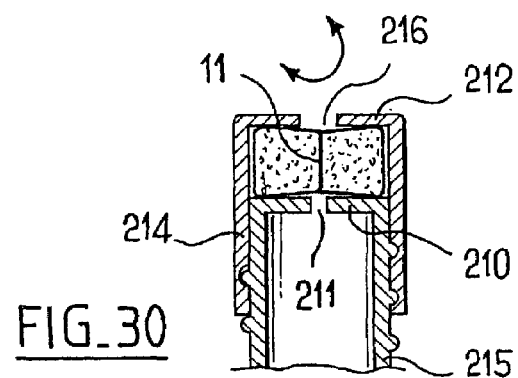
FIG. 30 is a partial, schematic cross-section view a further embodiment of a device for dispensing a product.

The invention is not limited to the exemplary embodiments described previously herein. For example, a cavity which houses the flow reducer may have a fixed or a variable volume (e.g., in embodiments having a cavity housing a flow reducer). FIG. 30 depicts an exemplary embodiment of a cavity of variable volume that may be defined between a wall 210 having an orifice 211, and a wall 212 which may be a portion of a ring 214. The ring 214 may be configured to be threaded onto a neck 215. The wall 212 may include at least one orifice 216. The wall 210 may be integral with the neck 215, as shown, or it may be a separate part (e.g., an insert configure to engage the neck 215 of the receptacle). By threading the ring 214 onto the neck 215, the flow reducer may be at least partially compressed in a variable manner, thereby enabling the properties of the flow reducer to be modified relative to, for example, flow of the product P during dispensing.

Figure 31:
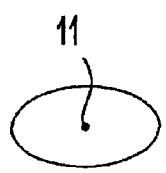
FIG. 31 is a plan view of another embodiment of a flow reducer.
Figure 32:
FIG. 32 is a schematic plan view of a further embodiment of a flow reducer.
Figure 33:
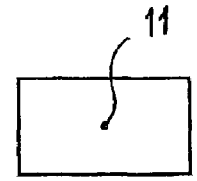
FIG. 33 is a schematic plan view of another embodiment of a flow reducer.

The cross-section of the flow reducer need not be circularly symmetrical. For example, the cross-section of the flow reducer may be oval-shaped, square-shaped, or rectangular-shaped, as shown in FIGS. 31 through 33, respectively, although this listing of shapes is not exhaustive and other shapes are contemplated.

It may be possible for the flow reducer to have one or more faces covered in a covering of flocking and/or a woven fabric or a non-woven fabric, as shown, for example, in FIG. 27.

Figure 34:
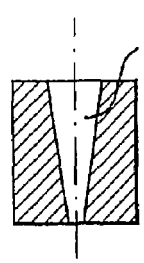
FIG. 34 is a schematic cross-section view of a further embodiment of a flow reducer.
Figure 35:
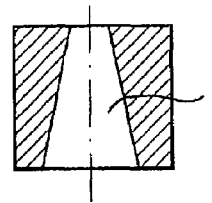
FIG. 35 is a schematic cross-section view of another embodiment of a flow reducer.

It may be possible to use a receptacle having a bellows suitable for being compressed by the user in such a manner so as to reduce the inside volume of the receptacle in order to dispense a product P. In some embodiments, the at least one passage 11 may have at least one slot that may have a varying width (e.g., the opposite edges of the at least one slot may converge or diverge toward an outlet end) as shown in FIGS. 34 and 35.

The device according to some exemplary embodiments of the invention may be used to dispense cosmetic products and/or care products, such as make-up products, dermatological substances, and/or pharmaceutical compositions used for treating and/or changing the appearance and/or scent of hair or skin. However, in its broadest aspects, the present invention could be used to dispense many other substances.

Furthermore, sizes of various structural parts and materials used to make the above-mentioned parts are illustrative and exemplary only, and one of ordinary skill in the art would recognize that these sizes and materials can be changed as necessary to produce different effects or desired characteristics.

It will be apparent to those skilled in the art that various modifications and variations can be made to the structure and methodology of the present invention. Thus, it should be understood that the invention is not limited to the examples discussed in the specification. Rather, the present invention is intended to cover modifications and variations.

What is claimed is:

1. A device for dispensing a product, the device comprising:
   a receptacle comprising at least one elastically deformable wall configured to be deformed to vary an interior volume of the receptacle; and
   a flow reducer defining a length and at least one passage, the flow reducer at least partially comprising an elastically deformable, compressible block of foam,
   wherein the at least one passage is substantially closed at at least one portion of its length when the flow reducer is in a substantially closed, at rest position, the at least one passage being configured to enlarge when the compressible material is at least partially compressed via the effect of pressure from the product when the interior volume of the receptacle is reduced, thereby enabling dispensing of at least a portion of the product via the at least one passage,
   wherein the flow reducer is configured such that the volume of the flow reducer becomes reduced when the at least one passage is enlarged from its substantially closed, at rest position, and
   wherein the flow reducer is configured to be permeable to air so as to enable intake of air when the at least one passage is closed.

2. The device of claim 1, wherein the flow reducer is configured to substantially prevent the product from flowing from the device via gravity when the receptacle is at least partially inverted.

3. The device of claim 1, wherein the flow reducer comprises at least one setback located adjacent to at least one of the at least one passage and the interior of the receptacle, wherein the at least one passage opens out into the at least one setback.

4. The device of claim 3, wherein the setback comprises a generally conical shape converging toward the at least one passage.

5. The device of claim 3, wherein the setback comprises a generally cylindrical shape.

6. The device of claim 3, wherein the setback is located at least partially within the interior of the receptacle.

7. The device of claim 4, wherein the setback is located at least partially outside of the receptacle.

8. The device of claim 3, wherein the flow reducer comprises at least two setbacks located at substantially opposite ends of the at least one passage.

9. The device of claim 1, wherein the flow reducer comprises a projection located at least partially outside of the receptacle, the at least one passage opening out through the projection.

10. The device of claim 1, wherein the flow reducer comprises one passage defining a single hole.

11. The device of claim 1, wherein the flow reducer comprises one passage defining a single slot.

12. The device of claim 1, wherein the flow reducer comprises a plurality of slots having ends, the plurality of slots meeting at common ends.

13. The device of claim 12, wherein the flow reducer comprises at least two slots, the at least two slots intersecting at intermediate portions of the at least two slots.

14. The device of claim 12, wherein the flow reducer comprises at least three slots having a common end, the at least three slots being substantially uniformly distributed in an angular relationship about an axis of the flow reducer.

15. The device of claim 1, wherein the flow reducer comprises at least one slot defining a varying width.

16. The device of claim 1, wherein the at least one passage is formed without removing material from the flow reducer.

17. The device of claim 1, wherein the flow reducer is fixed to a support via at least one of an adhesive, a heat-seal, a clamp, and a rivet.

18. The device of claim 17, wherein the flow reducer is fixed directly to the support.

19. The device of claim 17, wherein the flow reducer is fixed to the support via at least one separate element.

20. The device of claim 17, wherein the flow reducer comprises a face extending transversely to an axis of the at least one passage, and the flow reducer is fixed to a wall of the support via the face.

21. The device of claim 20, wherein the wall comprises at least one rib engaged with the flow reducer.

22. The device of claim 21, wherein the rib comprises an annular rib.

23. The device of claim 1, wherein the flow reducer comprises a multi-layer structure.

24. The device of claim 23, wherein at least one of the layers of the multi-layer structure has a density that is different from the density of at least one of the other layers.

25. The device of claim 23, wherein at least one of the layers of the multi-layer structure comprises a material different from a material of at least one of the other layers.

26. The device of claim 24, wherein the at least one passage comprises an outlet orifice, and a layer of the multi-layer structure closest to the outlet orifice of the at least one passage is air permeable.

27. The device of claim 1, wherein the device is configured so that the flow reducer comprises a surface configured to apply the product.

28. The device of claim 1, wherein the device is configured so that the flow reducer does not include a surface configured to apply a product.

29. The device of claim 28, wherein the flow reducer is set back from a top surface of the device.

30. The device of claim 1, further comprising a stopper configured to close the receptacle, wherein the flow reducer is configured to substantially match the inside shape of the stopper.

31. The device of claim 30, wherein the flow reducer is configured to be compressed when the stopper is placed on the receptacle.

32. The device of claim 1, wherein the flow reducer is fixed in a substantially non-removable manner to the receptacle.

33. The device of claim 1, wherein the receptacle comprises a neck and the device further comprises an insert configured to be fitted into the neck of the receptacle, wherein the flow reducer is fixed to the insert.

34. The device of claim 1, further comprising a support configured to be movable relative to a body of the receptacle, wherein the flow reducer is fixed to the support.

35. The device of claim 34, further comprising a shutter element configured to be movable relative to the body of the receptacle, wherein the flow reducer is fixed to the shutter element.

36. The device of claim 35, wherein the shutter element is movable between a first position configured to enable a product to exit the receptacle, and a second position configured to substantially prevent the product from exiting the receptacle.

37. The device of claim 36, wherein the flow reducer is located downstream from the shutter element relative to a direction of flow of the product when exiting the receptacle.

38. The device of claim 1, wherein the receptacle comprises a shutter element configured to move via turning relative to a body of the receptacle, the shutter element being configured to selectively interrupt exit of a product from the receptacle.

39. The device of claim 1, wherein the flow reducer comprises at least one face at least partially covered by at least one of a flocking and one of a woven fabric and a non-woven fabric.

40. The device of claim 1, wherein at least one of the flow reducer and the receptacle is configured to define a space enabling air to enter the device via a side surface of the flow reducer.

41. The device of claim 40, wherein the space comprises an annular space around the flow reducer.

42. The device of claim 1, wherein the flow reducer is fixed to the receptacle via a face opening to the outside of the receptacle.

43. The device of claim 1, wherein the at least one elastically deformable wall is configured to be squeezed by a user in order to reduce the interior volume of the receptacle.

44. The device of claim 1, wherein the receptacle defines a generally elongate cross-section.

45. The device of claim 44, wherein the receptacle defines a generally oval-shaped cross-section.

46. The device of claim 1, wherein the receptacle comprises at least two faces configured to be squeezed by the user in order to reduce the interior volume of the receptacle.

47. The device of claim 46, wherein the receptacle is configured to be sufficiently deformable to enable the at least two faces to contact each other when the user squeezes the receptacle.

48. The device of claim 1, wherein the receptacle comprises a capsule connected to a body of the flow reducer via a hinge.

49. The device of claim 1, wherein the interior volume of the receptacle ranges from about 50 milliliters to about 600 milliliters.

50. The device of claim 49, wherein the interior volume of the receptacle ranges from about 200 milliliters to about 600 milliliters.

51. The device of claim 1, further comprising at least one of a cosmetic product and a care product contained in the receptacle.

52. The device of claim 51, wherein the product comprises at least one of a shower gel, a shampoo, a body lotion, and an oil.

53. The device of claim 1, wherein the flow reducer comprises a filler comprising at least one biocidal agent.

54. The device of claim 1, wherein the flow reducer comprises a filler comprising at least one of magnetic particles and magnetizable particles.

55. The device of claim 1, further comprising a housing at least partially defining a fixed volume, wherein the flow reducer is located in the housing.

56. The device of claim 1, further comprising a housing at least partially defining a variable volume, wherein the flow reducer is located in the housing.

57. A method for dispensing at least one of a cosmetic product and a care product, the method comprising:
providing the device of claim 51; and
reducing the interior volume of the receptacle such that the pressure from the product compresses the compressible material, thereby enlarging the at least one passage such that at least a portion of the product is dispensed via the at least one passage.

58. The method of claim 57, wherein reducing the interior volume of the receptacle comprises squeezing the receptacle.

59. The method of claim 57, further comprising applying the product to at least one of skin and hair.

60. The device of claim 1, wherein the flow reducer lacks a surface configured to apply the product.

61. The device of claim 1, wherein the flow reducer is recessed with respect to the receptacle.

62. The device of claim 1, wherein the flow reducer comprises at least one material selected from composites, felts, polyurethanes, polyesters, polyethers, polyvinylchlorides, and nitril butyl rubber foams.

63. A device for dispensing a product, the device comprising:
 a receptacle defining a variable interior volume; and
 a flow reducer defining a length and at least one passage, the flow reducer at least partially comprising an elastically deformable, compressible block of foam permeable to air so as to enable intake of air when the at least one passage is closed,
 wherein the at least one passage is substantially closed at at least one portion of its length when the flow reducer is in a substantially closed, at rest position, the at least one passage being configured to enlarge when the compressible material is at least partially compressed via the effect of pressure from the product when the interior volume of the receptacle is reduced, thereby enabling dispensing of at least a portion of the product via the at least one passage, and
 wherein the flow reducer comprises a filler comprising at least one of magnetic particles and magnetizable particles.

64. The device of claim 63, wherein the flow reducer comprises at least one setback located adjacent to at least one of the at least one passage and the interior of the receptacle, wherein the at least one passage opens out into the at least one setback.

65. The device of claim 64, wherein the setback comprises a generally conical shape converging toward the at least one passage.

66. The device of claim 64, wherein the setback comprises a generally cylindrical shape.

67. The device of claim 64, wherein the setback is located at least partially within the interior of the receptacle.

68. The device of claim 65, wherein the setback is located at least partially outside of the receptacle.

69. The device of claim 64, wherein the flow reducer comprises at least two setbacks located at substantially opposite ends of the at least one passage.

70. The device of claim 63, wherein the flow reducer comprises a projection located at least partially outside of the receptacle, the at least one passage opening out through the projection.

71. The device of claim 63, wherein the flow reducer comprises one passage defining a single hole.

72. The device of claim 63, wherein the flow reducer comprises a multi-layer structure.

73. The device of claim 72, wherein at least one of the layers of the multi-layer structure has a density that is different from the density of at least one of the other layers.

74. The device of claim 72, wherein at least one of the layers of the multi-layer structure comprises a material different from a material of at least one of the other layers.

75. The device of claim 73, wherein the at least one passage comprises an outlet orifice, and a layer of the multi-layer structure closest to the outlet orifice of the at least one passage is air permeable.

76. The device of claim 63, wherein the device is configured so that the flow reducer comprises a surface configured to apply the product.

77. The device of claim 63, further comprising a support configured to be movable relative to a body of the receptacle, wherein the flow reducer is fixed to the support.

78. The device of claim 77, further comprising a shutter element configured to be movable relative to the body of the receptacle, wherein the flow reducer is fixed to the shutter element.

79. The device of claim 78, wherein the shutter element is movable between a first position configured to enable a product to exit the receptacle, and a second position configured to substantially prevent the product from exiting the receptacle.

80. The device of claim 79, wherein the flow reducer is located downstream from the shutter element relative to a direction of flow of the product when exiting the receptacle.

81. The device of claim 63, wherein the receptacle comprises a shutter element configured to move via turning relative to a body of the receptacle, the shutter element being configured to selectively interrupt exit of a product from the receptacle.

82. The device of claim 63, wherein the flow reducer comprises at least one face at least partially covered by at least one of a flocking and one of a woven fabric and a non-woven fabric.

83. The device of claim 63, wherein the flow reducer comprises an open-cell foam.

84. The device of claim 63, wherein at least one of the flow reducer and the receptacle are configured to define a space enabling air to enter the device via a side surface of the flow reducer.

85. The device of claim 84, wherein the space comprises an annular space around the flow reducer.

86. The device of claim 63, further comprising at least one of a cosmetic product and a care product contained in the receptacle.

87. The device of claim 86, wherein the product comprises at least one of a shower gel, a shampoo, a body lotion, and an oil.

88. The device of claim 63, wherein the flow reducer comprises a filler comprising at least one biocidal agent.

89. A method for dispensing at least one of a cosmetic product and a care product, the method comprising:
 providing the device of claim 86; and
 reducing the interior volume of the receptacle such that the pressure from the product compresses the compressible material, thereby enlarging the at least one passage such that at least a portion of the product is dispensed from the at least one passage.

90. The method of claim 89, further comprising applying the product to at least one of skin and hair.

91. The device of claim 63, wherein the flow reducer lacks a surface configured to apply the product.

92. The device of claim 63, wherein the flow reducer is recessed with respect to the receptacle.

93. A device for dispensing a product, the device comprising:
 a receptacle defining a variable interior volume;
 at least one of a cosmetic product and a care product contained in the receptacle; and a flow reducer defining a length and at least one passage, wherein the flow reducer is defined by a single piece of an elastically deformable, compressible block of foam, wherein the at least one passage is substantially closed at at least one portion of its length when the flow reducer is in a substantially closed, at rest position, the passage being configured to enlarge when the compressible material is compressed by the product when the interior volume of the receptacle is reduced, thereby enabling dispensing of at least a portion of the product via the at least one passage, wherein the flow reducer is fixed to a portion of the device such that the compressibility of the compressible material when compressed by the product is not substantially limited, wherein the flow reducer is configured such that the volume of the flow reducer becomes reduced when the at least one passage is enlarged from its substantially closed, at rest position, wherein the product comprises at least one of a shower gel, a shampoo, a body lotion, and an oil, and wherein the flow reducer is configured to be permeable to air so as to enable intake of air when the at least one passage is closed.

94. The device of claim 93, wherein the flow reducer comprises at least one setback located adjacent to at least one of the at least one passage and the interior of the receptacle, wherein the at least one passage opens out into the at least one setback.

95. The device of claim 94, wherein the setback comprises a generally conical shape converging toward the at least one passage.

96. The device of claim 94, wherein the setback comprises a generally cylindrical shape.

97. The device of claim 94, wherein the setback is located at least partially within the interior of the receptacle.

98. The device of claim 95, wherein the setback is located at least partially outside of the receptacle.

99. The device of claim 94, wherein the flow reducer comprises at least two setbacks located at substantially opposite ends of the at least one passage.

100. The device of claim 93, wherein the flow reducer comprises a projection located at least partially outside of the receptacle, the at least one passage opening out through the projection.

101. The device of claim 93, wherein the flow reducer comprises one passage defining a single hole.

102. The device of claim 93, wherein the flow reducer comprises a multi-layer structure.

103. The device of claim 102, wherein at least one of the layers of the multi-layer structure has a density that is different from the density of at least one of the other layers.

104. The device of claim 102, wherein at least one of the layers of the multi-layer structure comprises a material different from a material of at least one of the other layers.

105. The device of claim 103, wherein the at least one passage comprises an outlet orifice, and a layer of the multi-layer structure closest to the outlet orifice of the at least one passage is air permeable.

106. The device of claim 93, wherein the device is configured so that the flow reducer comprises a surface configured to apply the product.

107. The device of claim 93, further comprising a support configured to be movable relative to a body of the receptacle, wherein the flow reducer is fixed to the support.

108. The device of claim 107, further comprising a shutter element configured to be movable relative to the body of the receptacle, wherein the flow reducer is fixed to the shutter element.

109. The device of claim 108, wherein the shutter element is movable between a first position configured to enable a product to exit the receptacle, and a second position configured to substantially prevent the product from exiting the receptacle.

110. The device of claim 109, wherein the flow reducer is located downstream from the shutter element relative to a direction of flow of the product when exiting the receptacle.

111. The device of claim 93, wherein the receptacle comprises a shutter element configured to move via turning relative to a body of the receptacle, the shutter element being configured to selectively interrupt exit of a product from the receptacle.

112. The device of claim 93, wherein the flow reducer comprises at least one face at least partially covered by at least one of a flocking and one of a woven fabric and a non-woven fabric.

113. The device of claim 93, wherein at least one of the flow reducer and the receptacle are configured to define a space enabling air to enter the device via a side surface of the flow reducer.

114. The device of claim 113, wherein the space comprises an annular space around the flow reducer.

115. The device of claim 93, wherein the flow reducer comprises a filler comprising at least one biocidal agent.

116. The device of claim 93, wherein the flow reducer comprises a filler comprising at least one of magnetic particles and magnetizable particles.

117. A method for dispensing at least one of a cosmetic product and a care product, the method comprising:
providing the device of claim 93; and
reducing the interior volume of the receptacle such that the pressure from the product compresses the compressible material, thereby enlarging the at least one passage such that at least a portion of the product is dispensed from the at least one passage.

118. The method of claim 117, further comprising applying the product to at least one of skin and hair.

119. The device of claim 93, wherein the flow reducer lacks a surface configured to apply the product.

120. The device of claim 93, wherein the flow reducer is recessed with respect to the receptacle.

* * * * *